(12) United States Patent
Hsu et al.

(10) Patent No.: US 12,159,057 B2
(45) Date of Patent: Dec. 3, 2024

(54) IMPLEMENTING DATA FLOWS OF AN APPLICATION ACROSS A MEMORY HIERARCHY OF A DATA PROCESSING ARRAY

(71) Applicant: Xilinx, Inc., San Jose, CA (US)

(72) Inventors: Chia-Jui Hsu, Santa Clara, CA (US); Mukund Sivaraman, Palo Alto, CA (US); Vinod K. Kathail, Palo Alto, CA (US)

(73) Assignee: Xilinx, Inc., San Jose, CA (US)

( * ) Notice: Subject to any disclaimer, the term of this patent is extended or adjusted under 35 U.S.C. 154(b) by 0 days.

(21) Appl. No.: 17/934,153

(22) Filed: Sep. 21, 2022

(65) Prior Publication Data

US 2024/0094944 A1   Mar. 21, 2024

(51) Int. Cl.
*G06F 3/06* (2006.01)

(52) U.S. Cl.
CPC .......... *G06F 3/0656* (2013.01); *G06F 3/0622* (2013.01); *G06F 3/0683* (2013.01)

(58) Field of Classification Search
CPC ..... G06F 3/0656; G06F 3/0622; G06F 3/0683
See application file for complete search history.

(56) References Cited

U.S. PATENT DOCUMENTS

| | | | |
|---|---|---|---|
| 10,802,807 B1 | 10/2020 | Hsu et al. | |
| 10,990,552 B1 | 4/2021 | Bilski et al. | |
| 11,126,574 B1* | 9/2021 | Prabhakar | G06F 15/7871 |
| 11,281,440 B1 | 3/2022 | Hsu et al. | |
| 11,336,287 B1 | 5/2022 | Rodriguez et al. | |
| 2007/0050603 A1* | 3/2007 | Vorbach | G06F 9/3455 711/138 |
| 2019/0303311 A1* | 10/2019 | Bilski | G06F 13/4022 |
| 2020/0371759 A1* | 11/2020 | Sastry | G06F 15/7807 |
| 2020/0372200 A1* | 11/2020 | Sivaraman | G06F 16/9024 |
| 2021/0373867 A1* | 12/2021 | Chen | G06F 8/452 |
| 2022/0188638 A1* | 6/2022 | Mathaikutty | G06V 10/454 |
| 2023/0325312 A1* | 10/2023 | Koeplinger | G06F 15/7871 711/118 |

(Continued)

OTHER PUBLICATIONS

Gao, Mingyu, and Christos Kozyrakis. "HRL: Efficient and flexible reconfigurable logic for near-data processing." 2016 IEEE International Symposium on High Performance Computer Architecture (HPCA). Ieee, 2016. (Year: 2016).*

(Continued)

*Primary Examiner* — Nicholas J Simonetti
(74) *Attorney, Agent, or Firm* — Kevin T. Cuenot

(57) ABSTRACT

Implementing data flows of an application across a memory hierarchy of a data processing array includes receiving a data flow graph specifying an application for execution on the data processing array. A plurality of buffer objects corresponding to a plurality of different levels of the memory hierarchy of the data processing array and an external memory are identified. The plurality of buffer objects specify data flows. Buffer object parameters are determined. The buffer object parameters define properties of the data flows. Data that configures the data processing array to implement the data flows among the plurality of different levels of the memory hierarchy and the external memory is generated based on the plurality of buffer objects and the buffer object parameters.

20 Claims, 12 Drawing Sheets

(56) References Cited

U.S. PATENT DOCUMENTS

2024/0220269 A1* 7/2024 Eyole .................. G06F 9/38

OTHER PUBLICATIONS

Boulos, Vincent, et al. "Efficient implementation of data flow graphs on multi-gpu clusters." Journal of Real-Time Image Processing 9 (2014): 217-232. (Year: 2014).*

Thomas M. Parks, et al., "A Comparison of Synchronous and Cyclo-Static Dataflow", Presented at the Asilomar Conference on Signals, Systems and Computers—Oct. 1995, 7 pages.

* cited by examiner

104

```
1   template<typename _XILINX_ADF_T> class shared_buffer : public shared_buffer_base
2       {
3       public:
4           adf::vector<adf::port<adf::input>> in;
5           adf::vector<adf::port<adf::output>> out;
6
7           shared_buffer();
8
9           /// @param dimensions Shared buffer dimensions in terms of template data type.
10      dimension[0] is the fast-moving dimension and is contiguous in memory.
11          /// @param numInputs Number of input ports for write access.
12          /// @param numOutputs Number of output ports for read access.
13          static adf::shared_buffer<_XILINX_ADF_T> create(const std::vector<uint32_t>&
14      dimension, size_t numInputs, size_t numOutputs);
15      };
16
17  template<typename _XILINX_ADF_T> class external_buffer : public external_buffer_base
18      {
19      public:
20          adf::vector<adf::port<adf::input>> in;
21          adf::vector<adf::port<adf::output>> out;
22
23          external_buffer();
24
25          /// @param dimensions External buffer dimensions in terms of template data type.
26      dimension[0] is the fast-moving dimension and is contiguous in memory.
27          /// @param numInputs Number of input ports for write access.
28          /// @param numOutputs Number of output ports for read access.
29          static adf::external_buffer<_XILINX_ADF_T> create(const std::vector<uint32_t>&
30      dimension, size_t numInputs, size_t numOutputs)
31      };
32
33  constraints<access_pattern> write_access(adf::port<adf::input>& p);
34  constraints<access_pattern> read_access(adf::port<adf::output>& p);
35  access_pattern tiling(const tiling_parameters& tilingParams)
```

```
36    struct traversing_parameters
37    {
38        /// The dimension for inter-tile traversal.
39        uint32_t dimension;
40        /// Stride in terms of buffer element type for inter-tile traversal.
41        uint32_t stride;
42        /// wrap represents the number of steps before wrapping dimension order and incrementing
43    dimension order+1 for inter-tile traversal.
44        /// The traversal stops when the last wrap completes.
45        uint32_t wrap;
46    };
47
48
49    struct tiling_parameters
50    {
51        /// Buffer dimensions in buffer element type. buffer_dimension[0] is the fast-moving
52    dimension and is contiguous in memory.
53        /// When this variable is left unspecified, the dimensions of the associated buffer object will
54    be used.
55        std::vector<uint32_t> buffer_dimension;
56        /// Tiling dimensions in buffer element type.
57        std::vector<uint32_t> tiling_dimension;
58        /// Multi-dimensional offset w.r.t. buffer starting element. Assuming buffer dimension is
59    specified.
60        std::vector<int32_t> offset;
61        /// Tile traversal parameters.
62        std::vector<traversing_parameters> tile_traversal;
63        /// Output port id of the connected pktsplit or the input port id of the connected pktmerge.
64        int packet_port_id = -1;
65        /// Number of repetitions of tiling traversal
66        uint32_t repetition = 1;
67        /// Phase of tiling parameter resource sharing and execution
68        uint32_t phase = 0;
69        /// Real data boundary dimension for padding
70        std::vector<uint32_t> boundary_dimension;
71    };
```

```
    Class mygraph : public graph
1   {
2       kernel k1, k2, k3, k4;
3       shared buffer<int> mtx;
4       mygraph ()
5       {
6           k1 = kernel::create(func1); k2 = kernel::create(func2); k3 = kernel::create(func3); k4 =
7   kernel::create (func4);
8           mtx = shared buffer<int>::create({10, 6} , 2, 2); // 10x6, 2 write-inputs, 2 read-outputs
9           connect(k1.out[0], mtx.in[0]);
10          write access(mtx.in[0]) = tiling({.buffer dimension={10, 6}, .tiling dimension={3,2},
11  .offset={0,0}, .tiling traversal= {{.dimension= 0, .stride= 3, .wrap= 2}, {.dimension= 1, .stride= 2,
12  .wrap= 3} });
13          connect(k2.out[0], mtx.in[1]);
14          write access(mtx.in[1]) = tiling({.buffer dimension={10,6}, .tiling dimension={2,2},
15  .offset={6,0}, .tiling traversal= {{.dimension= 0, .stride= 2, .wrap= 2}, {.dimension= 1, . stride= 2,
16  .wrap= 3} });
17          connect(mtx.out[0], k3.in[0]);
18          read access(mtx.out[0]) = tiling({.buffer dimension={10,6},  .tiling,,dimension={2,6},
19  .offset={0,0},.tiling traversal= {{.dimension= 0, .stride= 2, .wrap= 2} });
20          connect(mtx.out[1], k4.in(0]);
21          read access(mtx.out[1]) = tiling({.buffer dimension={10,6}, .tiling dimension={3,6},
22  .offset={4,0}, .tiling traversal= {{.dimension= 0, .stride= 3, .wrap= 2} });}
    };
```

FIG. 5

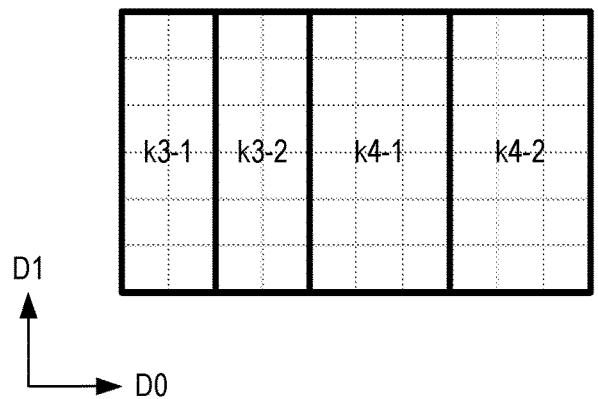

```
1   {
2       kernel k1, k2;
3       shared buffer<int> tensor;
4       external buffer<int> ddrin;
5       mygraph()
6       {
7           k1 = kernel::create(func1); k2 = kernel::create(func2);
8           ddrin = external_buffer<int>::create({10,6,100}, 0, 1); //10x6x100, 1 read-outputs.
9           tensor = shared_buffer<int>::create ({10, 6, 10}, 1, 2); //10x6x10, 1 write-inputs, 2 read-
10  outputs.
11          connect<>{ddrin.out 0], tensor.in[0]);
12          read_access{ddrin,out[0]) = tiling{{.buffer dimension={10,6,100}, .tiling
13  dimension={10,6,10}, .offset={0,0}, .tiling traversal= {{.dimension= 2, .stride= 10, .wrap= 10} });
14          //a tensor in mem tile is a sub-volume of ddrin, so access pattern offset is in D2, stride 10,
15  num steps 10
16      }
17  };
```

FIG. 8

IMPLEMENTING DATA FLOWS OF AN APPLICATION ACROSS A MEMORY HIERARCHY OF A DATA PROCESSING ARRAY

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to implementing an application in a data processing array and, more particularly, to implementing data flows of the application across a memory hierarchy of target hardware including the data processing array.

BACKGROUND

Some varieties of integrated circuits provide architectures that include multiple compute units. Such ICs are capable of providing significant computational power and a high degree of parallelism. Applications can be created for execution on target hardware having a multi-compute unit architecture using a data flow model of computation. For example, machine learning applications are often specified using a data flow model of computation. Examples of computational data flow models used to create applications include synchronous data flow, cyclo-static data flow, and multi-dimensional data flow. Each of these computational models focuses on data production properties and data consumption properties between computational nodes in a data flow graph used to specify the application. In general, a data flow graph is a collection of nodes and edges in which the nodes represent operations performed on data and the edges represent communication links that convey data among the nodes.

An application intended to execute on a multi-compute unit hardware architecture often consumes significant amounts of data. The ability to efficiently provide data to the compute units and output resulting data from the compute units has a significant effect on runtime performance of the application as executed on the target hardware. Currently available data flow models of computation are unable to define data movements of an application in a manner that accounts for the architecture, including the memory hierarchy, of the target hardware. Further, many modern machine learning applications rely on multi-producer and multi-consumer operation. Available data flow models, however, lack support for multi-producer and multi-consumer semantics.

SUMMARY

In one or more example implementations, a method includes receiving a data flow graph specifying an application for execution on a data processing array. The method includes identifying a plurality of buffer objects corresponding to a plurality of different levels of a memory hierarchy of the data processing array and an external memory. The plurality of buffer objects specify data flows. The method includes determining buffer object parameters. The buffer object parameters define properties of the data flows. The method includes generating data that configures the data processing array to implement the data flows among the plurality of different levels of the memory hierarchy and the external memory based on the plurality of buffer objects and the buffer object parameters.

In one or more example implementations, a system includes one or more processors configured to initiate operations. The operations include receiving a data flow graph specifying an application for execution on a data processing array. The operations include identifying a plurality of buffer objects corresponding to a plurality of different levels of a memory hierarchy of the data processing array and an external memory. The plurality of buffer objects specify data flows. The operations include determining buffer object parameters. The buffer object parameters define properties of the data flows. The operations include generating data that configures the data processing array to implement the data flows among the plurality of different levels of the memory hierarchy and the external memory based on the plurality of buffer objects and the buffer object parameters.

In one or more example implementations, a computer program product includes one or more computer-readable storage media, and program instructions collectively stored on the one or more computer-readable storage media. The program instructions are executable by computer hardware to initiate operations. The operations can include receiving a data flow graph specifying an application for execution on a data processing array. The operations include identifying a plurality of buffer objects corresponding to a plurality of different levels of a memory hierarchy of the data processing array and an external memory. The plurality of buffer objects specify data flows. The operations include determining buffer object parameters. The buffer object parameters define properties of the data flows. The operations include generating data that configures the data processing array to implement the data flows among the plurality of different levels of the memory hierarchy and the external memory based on the plurality of buffer objects and the buffer object parameters.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIGS. 3A and 3B, taken collectively, illustrate an example implementation of a graph Application Programming Interface for specifying a plurality of buffer objects corresponding to a plurality of different levels of a memory hierarchy and an external memory and associated data access patterns and movement.

FIG. 5 illustrates an example of a data flow graph specifying an application intended for implementation in a data processing array, where the application has multi-producer, multi-consumer access behavior for a shared buffer.

FIG. 7B illustrates an example read access pattern of a shared buffer.

FIG. 8 illustrates another example of a data flow graph specifying an application intended for implementation in a data processing array, wherein the application includes data movement across multiple levels of a memory hierarchy and an external memory.

DETAILED DESCRIPTION

This disclosure relates to implementing an application in a data processing array and, more particularly, to implementing data flows of the application across a memory hierarchy of target hardware including the data processing array. In accordance with the inventive arrangements described within this disclosure, a programming model is provided that supports multi-dimensional data and movement of such data throughout a memory hierarchy of a data processing array and an external memory. The programming model provides constructs and application programming interfaces (APIs) that are used within an application to define the movement of the multi-dimensional data across various levels of the memory hierarchy and the external memory of the target hardware.

In one or more example implementations, the programming model supports multi-producer and/or multi-consumer semantics for accessing multi-dimensional data stored at various levels of the memory hierarchy. The programming model, when utilized to specify an application, may be compiled by a compiler to generate data that is loadable into the target hardware to configure the data processing array. The data processing array is configured by the data to implement the application therein and to implement the data flows defined by the application using the programming model.

Further aspects of the inventive arrangements are described below with reference to the figures.

Figure 1:
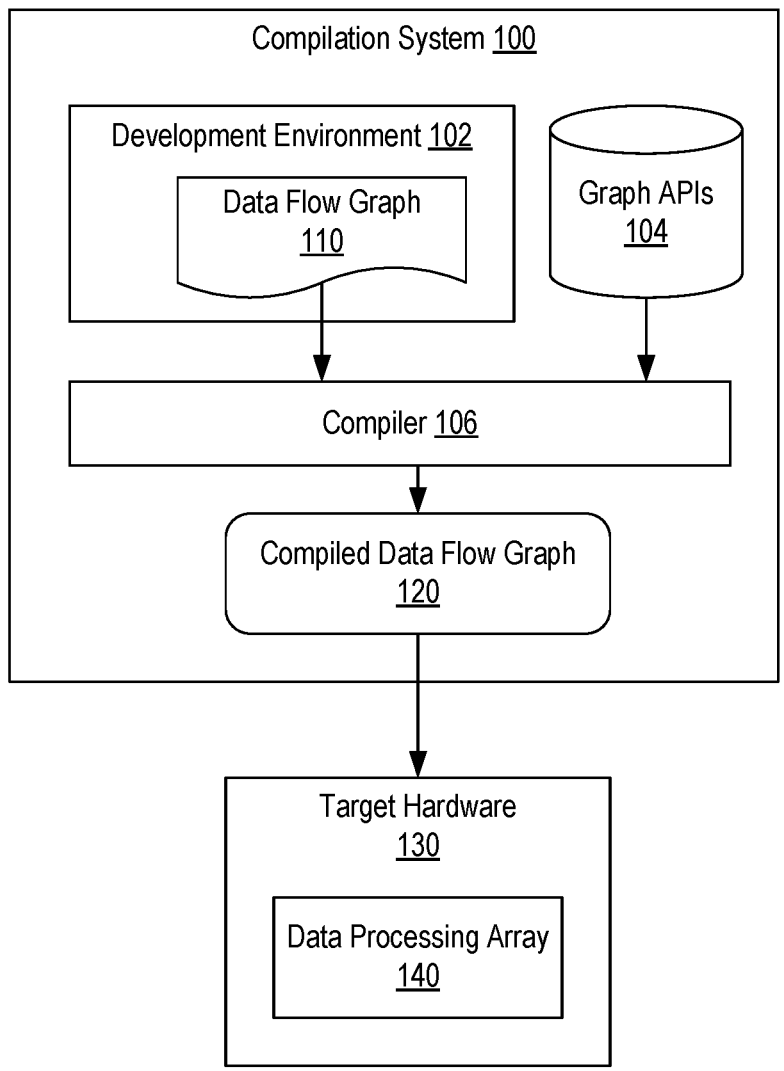
FIG. 1 illustrates an example of a compilation system configured to compile an application for a data processing array.

FIG. 1 illustrates an example of a compilation system 100 configured to compile an application for a data processing array 140. Compilation system 100 may be implemented as a data processing system, e.g., a computer, executing suitable operational software or program instructions to perform the various operations described within this disclosure. An example of a data processing system that may be used to implement compilation system 100 is described in connection with FIG. 14.

In the example of FIG. 1, compilation system 100 includes a development environment 102, graph application programming interfaces (APIs) 104, and a compiler 106. Using development environment 102, a user is capable of creating a data flow graph 110 specifying an application. Data flow graph 110 is intended to execute on data processing array 140 and may be specified using a high-level programming language. Examples of high-level programming languages include, but are not limited to, C and/or C++. Other examples of high-level programming languages include, but are not limited to, Python, Javascript, Swift, Go, LabView, or Simulink. The data flow graph, which is specified as a software description (e.g., source code) includes one or more kernels. The kernels, which are considered nodes of data flow graph 110, are coupled by one or more edges. Each edge represents a connection or a communication link between the linked or connected nodes.

A kernel refers to a software data processing element. A kernel may be a user-specified (e.g., custom) data processing element or a data processing element obtained from a standard library of software-based kernels. The kernel may implement any of a variety of different functions including commonly used functions. These functions may be specific to a particular domain such as image processing, communications, cryptography, machine learning, or the like. A kernel may be specified in a high-level programming language such as C/C++ and compiled. Other examples of high-level programming languages include, but are not limited to, Python, Javascript, Swift, Go, LabView, or Simulink. It should be appreciated that kernels may be specified in any of a variety of different programming languages whether high-level or low level. The kernel may be compiled into computer-readable program instructions executable by a hardware processor or compiled into circuitry (e.g., implemented using programmable circuitry such as programmable logic).

Using graph APIs 104, data flow graph 110 also defines one or more data nodes. Each data node may be specified within data flow graph 110 as a buffer. In one or more examples, buffers may be specified as different types. For example, a data node of data flow graph 110 may be specified as a "shared buffer" or as an "external buffer." In conventional applications specified as data flow graphs, nodes are limited to specifying computational nodes (e.g., kernels). In contrast to conventional data flow graphs, the inventive arrangements described herein expand the set of graph objects, available APIs, and available semantics for creating a data flow graph 110 to include data nodes. The inclusion of data nodes in the data flow graph with kernels allows an application developer to specify particular data flows using the buffer objects, which correspond to particular levels of memory hierarchy in the data processing array 140.

Within this disclosure, various levels of memory hierarchy are described. It should be appreciated that the memory hierarchy that may be modeled using buffer types as nodes within a data flow graph may be arbitrarily specified to correspond to a particular hardware architecture that is to be used to implement an application represented by the data flow graph. In this regard, the "shared buffer" and the "external buffer" types described herein are provided as examples and are not intended as limitations. In addition, in certain contexts, one or more of the data nodes may not map to an actual data storage device or memory, but rather to a mechanism such as a circuit for accessing the data storage device or memory.

Compiler 106 is capable of compiling data flow graph 110 and graph APIs 104 to generate compiled data flow graph 120. Compiled data flow graph 120 may be specified as binary code. Compiled data flow graph 120 may be loaded into target hardware 130 including data processing array 140 to implement data flow graph 110 in data processing array 140. Compiled data flow graph 120 may specify compiled versions of kernels, a mapping of kernels to different compute tiles of data processing array 140, data establishing stream channels within data processing array 140, a mapping of data nodes to levels of memory hierarchy of data processing array 140 and/or target hardware 130, and/or data that, when loaded into appropriate configuration registers of data processing array 140, implements data flows across the memory hierarchy of data processing array. As described in greater detail below, the data flows may involve a global memory that is external to data processing array 140.

Figure 2:
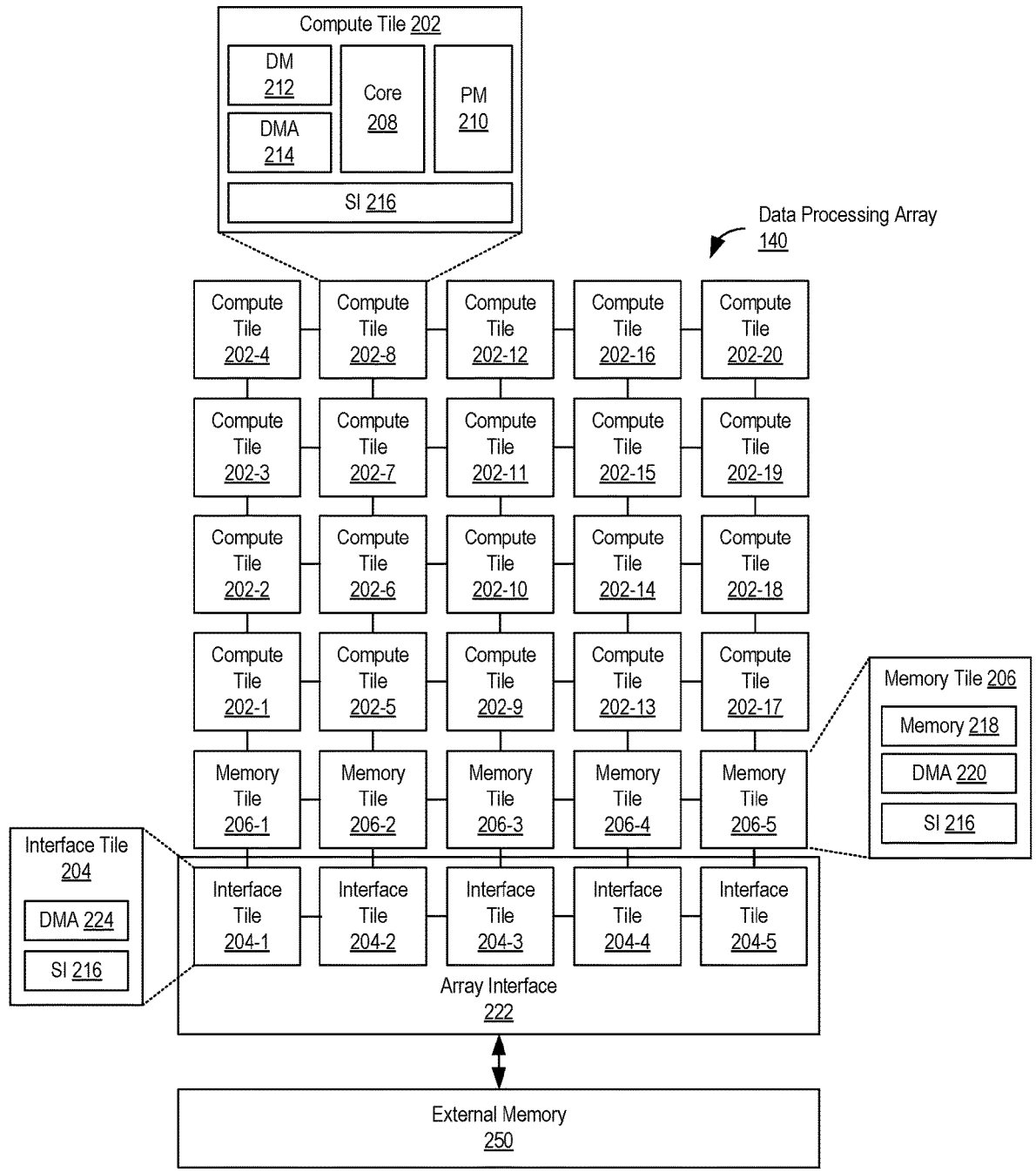
FIG. 2 illustrates an example implementation of a data processing array.

FIG. 2 illustrates an example implementation of data processing array 140. Data processing array 140 may be implemented as a plurality of interconnected tiles. The term "tile," as used herein in connection with a data processing array, means a circuit block. The interconnected tiles of data processing array 140 include compute tiles 202, interface tiles 204, and memory tiles 206. The tiles illustrated in FIG. 2 may be arranged in an array or grid and are hardwired.

Each compute tile 202 can include one or more cores 208, a program memory (PM) 210, a data memory (DM) 212, a DMA circuit 214, and a stream interconnect (SI) 216. In one aspect, each core 208 is capable of executing program code stored in program memory 210. In one aspect, each core 208 may be implemented as a scalar processor, as a vector processor, or as a scalar processor and a vector processor operating in coordination with one another.

In one or more examples, each core 208 is capable of directly accessing the data memory 212 within the same compute tile 202 and the data memory 212 of any other compute tile 202 that is adjacent to the core 208 of the compute tile 202 in the up, down, left, and/or right directions. Core 208 sees data memories 212 within the same tile and in one or more other adjacent compute tiles as a unified region of memory (e.g., as a part of the local memory of the core 208). This facilitates data sharing among different compute tiles 202 in data processing array 140. In other examples, core 208 may be directly connected to data memories 212 in other compute tiles 202.

Cores 208 may be directly connected with adjacent cores 208 via core-to-core cascade connections (not shown). In one aspect, core-to-core cascade connections are unidirectional and direct connections between cores 208. In another aspect, core-to-core cascade connections are bidirectional and direct connections between cores 208. In general, core-to-core cascade connections allow the results stored in an accumulation register of a source core 208 to be provided directly to an input of a target or load core 208. This means that data provided over a cascade connection may be provided among cores directly with less latency since the data does not traverse the stream interconnect 216 and is not written by a first core 208 to data memory 212 to be read by a different core 208.

In an example implementation, compute tiles 202 do not include cache memories. By omitting cache memories, data processing array 140 is capable of achieving predictable, e.g., deterministic, performance. Further, significant processing overhead is avoided since maintaining coherency among cache memories located in different compute tiles 202 is not required. In a further example, cores 208 do not have input interrupts. Thus, cores 208 are capable of operating uninterrupted. Omitting input interrupts to cores 208 also allows data processing array 140 to achieve predictable, e.g., deterministic, performance.

In the example of FIG. 2, each compute tile 202 may be implemented substantially identically to include the same hardware components and/or circuitry. Further, data processing array 140 may include an array of compute tiles formed of any of a variety of processing elements such as digital signal processing engines, cryptographic engines, Forward Error Correction (FEC) engines, or other specialized hardware for performing one or more specialized tasks.

In one or more other examples, compute tiles 202 may not be substantially identical. In this regard, compute tiles 202 may include a heterogeneous mix of compute tiles 202 formed of two or more different types of processing elements. As an illustrative and nonlimiting example, different ones of compute tiles 202 may include processing elements selected from two or more of the following groups: digital signal processing engines, cryptographic engines, Forward Error Correction (FEC) engines, or other specialized hardware.

In the example of FIG. 2, data processing array 140 includes one or more memory tiles 206. Memory tiles 206 include a memory 218 (e.g., a RAM), a DMA circuit 220, and a stream interconnect 216. Each memory tile 206 may read and/or write to the memory 218 of an adjacent memory tile 206 by way of the DMA 220 included in the memory tile 206. Further, data can be moved to/from the data memory 212 of any compute tile 202 (e.g., by the corresponding DMA 214) from/to the memory 218 of any memory tile 206 (e.g., by the corresponding DMA 220 or the DMA 220 of an adjacent memory tile 206). In doing so, the data is routed through one or more of stream interconnects 216. Memory tiles 206 are characterized by the lack of computational components such as processors (e.g., cores 208). In the example of FIG. 2, each memory tile 206 may be implemented substantially identically to include the same hardware components and/or circuitry. In one or more other examples, memory tiles 206 may not be substantially identical.

Interface tiles 204 form an array interface 222 for data processing array 140. Array interface 222 operates as an interface that connects tiles of data processing array 140 to other resources of the particular IC in which data processing array 140 is disposed. In the example of FIG. 2, array interface 222 includes a plurality of interface tiles 204 organized in a row. Interface tiles 204 can include a stream interconnect 216 and a DMA circuit 224. Interface tiles 204 are connected so that data may be propagated from one interface tile to another bi-directionally. Each interface tile 204 is capable of operating as an interface for the column of tiles directly above and is capable of interfacing such tiles with components and/or subsystems of the IC in which data processing array 140 is disposed.

In the example of FIG. 2, array interface 222 (e.g., one or more of the interface tiles 204) communicatively links external memory 250 with compute tiles 202 and/or memory tiles 206. External memory 250 is an example of a global memory. External memory 250, for example, may be considered a global memory in that external memory 250 may be read and/or written by data processing array 140 and/or one or more other entities such as a host data processing system that couples to the target hardware 130 (e.g., an IC) including data processing array 140.

In addition, external memory 250, as the name suggests, is external to data processing array 140. In one example, external memory 250 represents memory that is implemented in the same IC as data processing array 140. That is, external memory 250 may be an "on-chip" memory whether disposed on the same die as data processing array 140 or on a different die than data processing array 140 but within the same IC package. In another example, external memory 250 may be external to the IC in which data processing array 140 is implemented. In that case, external memory 250 may be disposed on the same circuit board as the IC including data processing array 140. For example, external memory 250 may be implemented as a Double Data Rate, Synchronous Dynamic Random Access Memory (DDR).

In the example of FIG. 2, array interface 222 may communicatively link compute tiles 202 and/or memory tiles 206 with one or more other subsystems of the IC. Such other subsystems may include, but are not limited to, a network-on-chip, a processor system including one or more hardened processor and/or processor cores, programmable logic, and/or other Application Specific IC (ASIC) blocks.

FIG. 2 illustrates the memory hierarchy of data processing array 140. In the example, the memory hierarchy of data processing array 140 includes external memory 250, memory tiles 206, and/or data memories 212 of compute tiles 202. For purposes of illustration, the data flows defined by data flow graph 110 may utilize the memory hierarchy of data processing array 140 and external memory 250. In implementing data flow graph 110, data flows of the application may be defined using graph APIs 104. The data flows may occur between external memory 250 and one or more data memories 212 (e.g., compute tiles 202), between external memory 250 and one or more memory tiles 206, and/or between one or more memory tiles 206 and one or more data memories 212 (e.g., compute tiles 202). Graph APIs 104 define additional objects that may be used to specify such data flows.

FIGS. 3A and 3B, taken collectively, illustrate an example implementation of graph APIs 104. Graph APIs 104 define various buffer objects that map onto the memory hierarchy of data processing array 140 and external memory 250, APIs, and semantics to define data movement for an application.

Referring to FIG. 3A, lines 1-15 define a shared buffer object. Each shared buffer object that is instantiated maps to, or correlates with, a particular memory tile 206 of FIG. 2. The shared buffer object represents multi-dimensional data that may be stored in the memory tile 206. The dimensions of the data may be specified by the "dimension" parameter at line 14 of the constructor for the shared buffer object.

In general, each shared buffer object that is instantiated includes one or more input ports and one or more output ports that represent DMA channels of DMA circuits 220. Referring to line 4, the shared buffer object has one, two, or more input ports. The particular number of input ports may be specified by the numInputs parameter in the constructor of the shared buffer object at lines 13-14. Each input port of the shared buffer object represents a logical stream-to-memory mapped (S2MM) DMA channel of DMA circuit 220 in the memory tile 206. Each S2MM DMA channel of a shared buffer object physically maps to the S2MM DMA channel of the memory tile 206 that receives stream data as input via a stream interface of the DMA channel coupled to stream interconnect 216 and writes such data to memory 218 within the memory tile 206 via a memory-mapped interface of the DMA channel.

Referring to line 5, the shared buffer object has one, two, or more output ports. The particular number of output ports may be specified by the numOutputs parameter in the constructor of the shared buffer object at lines 13-14. The shared buffer object has one, two, or more output ports. Each output port of the shared buffer object represents a logical memory mapped-to-stream (MM2S) DMA channel of DMA circuit 220 in the memory tile 206. Each MM2S DMA channel of a shared buffer object physically maps to the MM2S DMA channel of the memory tile 206 that reads data from memory 218 therein via a memory-mapped interface of the DMA channel and outputs the data as a data stream to stream interconnect 216 via a stream interface of the DMA channel.

The capability of the shared buffer object to have multiple input ports allows the shared buffer object to connect to multiple data producers that are capable of sending data to the shared buffer object for storage therein (e.g., for storage in memory 218 of the memory tile 206). Similarly, the capability of the shared buffer object to have multiple output ports allows the shared buffer object to send data to multiple data consumers (e.g., send data from memory 218 of the memory tile 206 to the multiple data consumer(s)).

In addition, a shared buffer object input port can connect to other data storage buffer objects such as one or more shared buffers and/or one or more external buffers. Similarly, a shared buffer object output port can connect to data storage buffer objects such as one or more shared buffers and/or one or more external buffers. These mechanisms may be used to specify data transfers between memory tiles and/or between memory tile and external memory in an application.

Referring to FIG. 3A, lines 17-31 define an external buffer object. Each external buffer object that is instantiated maps to, or correlates with, external memory 250 of FIG. 2. The external buffer object represents multi-dimensional data that may be stored in external memory 250. The dimensions of the data may be specified by the "dimension" parameter at line 30 of the constructor for the external buffer object.

In general, each external buffer object that is instantiated includes one or more input ports and one or more output ports that represent DMA channels of DMA circuits 224. Referring to line 20, the external buffer object has one, two, or more input ports. The particular number of input ports may be specified by the numInputs parameter in the constructor of the external buffer object at lines 29-30. Each input port of the external buffer object represents a logical stream-to-memory mapped (S2MM) DMA channel of DMA circuit 224 in a particular interface tile 204. Each S2MM DMA channel of an external buffer object physically maps to the S2MM DMA channel of the interface tile 204 that receives stream data as input via a stream interface of the DMA channel coupled to stream interconnect 216 (in interface tile 204) and writes such data to external memory 250 via a memory-mapped interface of the DMA channel.

Referring to line 21, the external buffer object has one, two, or more output ports. The particular number of output ports may be specified by the numOutputs parameter in the constructor of the external buffer object at lines 29-30. The shared buffer object has one, two, or more output ports. Each output port of the shared buffer object represents a logical memory mapped-to-stream (MM2S) DMA channel of DMA circuit 224 in the interface tile 204. Each MM2S DMA channel of an external buffer object physically maps to the MM2S DMA channel of the interface tile 204 that reads data from external memory 250 via a memory-mapped interface of the DMA channel and outputs the data as a data stream to stream interconnect 216 (e.g., of the interface tile 204) via a stream interface of the DMA channel.

The capability of the external buffer object to have multiple input ports allows the external buffer object to connect to multiple data producers capable of sending data to the external buffer object for storage therein (e.g., for storage in external memory 250). Similarly, the capability of the external buffer object to have multiple output ports allows the external buffer object to send data to multiple data consumers (e.g., send data from external memory 250 to the data consumer(s)).

In addition, an external buffer object input port can connect to other data storage buffer objects of the memory hierarchy of the data processing array. Similarly, an external buffer object output port can connect to data storage buffer objects of the memory hierarchy of the data processing array. These mechanisms may be used to specify data transfers between external buffer objects and one or more other buffer objects of the memory hierarchy of the data processing array.

Referring to FIG. 3B, graph API 104 defines various parameters that specify read access patterns and/or write access patterns for the buffer objects within data flow graph 110. The parameters illustrated in FIG. 3B may be specified for a shared buffer object and/or for an external buffer object. The parameters of FIG. 3B further allow data flow graph 110 to specify multi-dimensional data tiling, sub-volume tiling, sub-volume and/or data tile traversal, zero-padding, logical packet network connection, and repetition of the access pattern for shared buffer objects and/or external buffer objects. The example of FIG. 3B illustrates that the various parameters may be specified at a high-level of abstraction.

Lines 36-46 specify traversing parameters. The traversing parameters include a dimension parameter that specifies a dimension for inter-data tile traversal; a stride parameter that specifies a distance in terms of number of data elements in the traversal dimension between consecutive tile traversing steps, and a wrap parameter that indicates the number of steps before wrapping the dimension and incrementing the dimension+1 for inter-data tile traversal.

Lines 49-71 specify tiling parameters. The tiling parameters include a buffer_dimension parameter that specifies the buffer dimensions in the buffer element type. buffer_dimension[0] is the fast-moving dimension and is contiguous memory. The tiling_dimension parameter specifies the tiling dimensions of the buffer element type. The offset parameter specifies a multi-dimensional offset with respect to the buffer starting element. The tile_traversal parameter specifies a vector of traversing parameters, where tile_traversal [0], tile_traversal[1], . . . , tile_traversal[N−1] represent loops of a traversing pattern from the most inner loop to the most outer loop. For example, tile_traversal[i].dimension represents the buffer object dimension in the i-th loop of the traversal. The packet_port_id parameter specifies the output port identifier of the connected packet split or the input port identifier of the connected packet merge. The repetition parameter specifies the number of repetitions of the tiling traversal. The phase parameter specifies the phase of the tiling parameter resource sharing and execution. The boundary_dimension parameter specifies the real data boundary dimension to be used in performing padding.

As noted, the buffer objects may be implemented as data nodes in the data flow graph 110, which expresses the computational model for the application. The various parameters described in connection with FIG. 3B describe multi-dimensional data tiling and access patterns implemented at the input port(s) and the output port(s) of the shared buffer objects and/or the external buffer objects (e.g., data nodes of the data flow graph). By comparison, in traditional data flow computation models, production and consumption rates are typically specified for ports of computation nodes. Conventional data flow computation models do not include data nodes.

The graph APIs 104 also includes access rules that ensure data integrity in multi-producer and/or multi-consumer implementations for shared buffer objects and/or for external buffer objects. These access rules, which are enforced within data flow graph 110, include the following:

Read access from an output port of a buffer object may only start in response to all write accesses via input port(s) of the buffer object completing;

Write accesses to multiple input ports of a buffer object cannot overlap in memory; and Read accesses from multiple output ports of a buffer object can overlap in memory.

Though not described within this disclosure, additional buffer ports representing kernel buffer ports (e.g., as mapped to and implemented in a particular compute tile 202) may be specified within data flow graph 110. These buffer ports represent data stored in data memories 212 (e.g., locally within a compute tile 202). With the addition of the shared buffer objects and the external buffer objects, data flow graph 110 is capable of specifying data and data movements throughout all levels of the memory hierarchy of data processing array 140. Compiler 106 is capable of recognizing the data flows specified between the various types of nodes specified (e.g., data nodes and/or computation nodes), data access patterns, and multi-producer and/or multi-consumer semantics. The ability to recognize such data flows within data flow graph 110 allows compiler 106 to generate the configuration data needed to program control registers of data processing array 140 to effectuate the specified data movements therein and ensure that the data movements are synchronized across the memory hierarchy in accordance with the access rules indicated above. In one aspect, data movements may be synchronized using locks.

Figure 4:
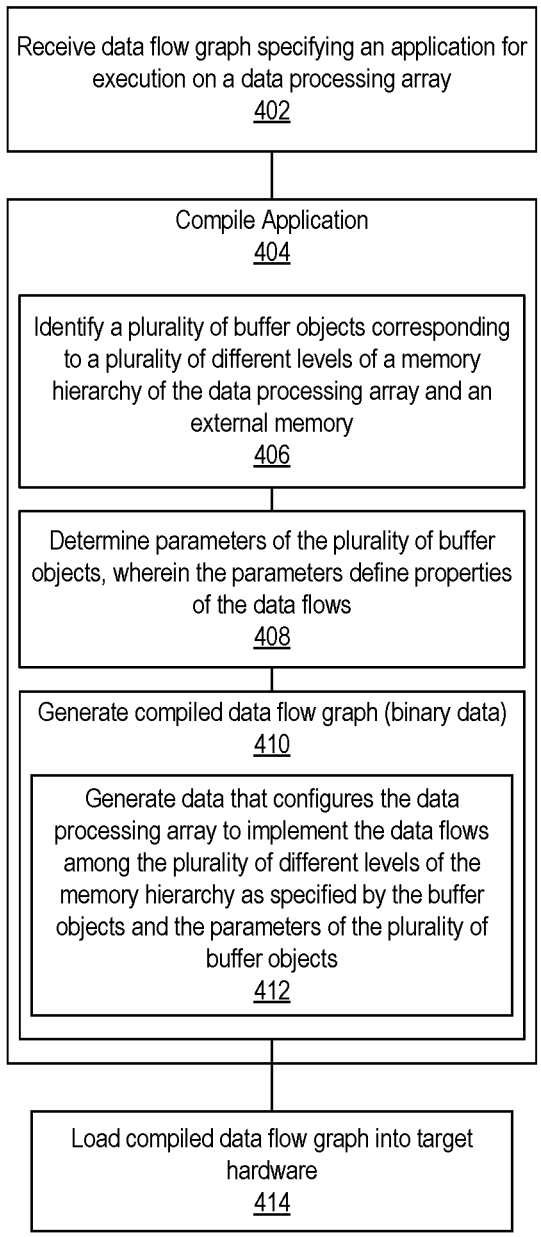
FIG. 4 illustrates an example method of compiling a data flow graph for execution in a data processing array.

FIG. 4 illustrates an example method 400 of compiling data flow graph 110 for execution in data processing array 140. Method 400 may be performed by the compilation system 100 of FIG. 1.

In block 402, compilation system 100 receives data flow graph 110 specifying an application for execution on data processing array 140. Data flow graph 110 includes a plurality of data nodes. The data nodes are specified as buffer objects as described within this disclosure. In one aspect, one or more of the plurality of buffer objects is a shared buffer object representing a memory tile of the data processing array (e.g., multi-dimensional data stored in a memory tile of the data processing array). In another aspect, one or more of the plurality of buffer objects is an external buffer object representing a global memory that is external to the data processing array (e.g., representing multi-dimensional data stored in the global memory).

In block 404, compilation system 100 begins performing a compilation process on data flow graph 110. For example, in block 406, compilation system 100 is capable of identifying a plurality of buffer objects corresponding to a plurality of different levels of a memory hierarchy of data processing array 140 and external memory 250. The plurality of buffer objects specify data flows. In this sense, compilation system 100 effectively detects data flows in data flow graph through identification of the plurality of buffer objects. One or more of the data transfers may be between a buffer object selected from the plurality of buffer objects and multiple data consumers. One or more of the data transfers may be between a buffer object selected from the plurality of buffer objects and multiple data producers.

In one or more example implementations, a kernel, as implemented in a core 208 of a compute tile 202 is an example of a data producer and/or a data consumer. A kernel that receives input from a buffer object (e.g., that reads data from the buffer object) is considered a data consumer. A kernel that provides data to a buffer object (e.g., that writes data to a buffer object) is considered a data producer.

In block 408, compilation system 100 determines buffer object parameters of the plurality of buffer objects. The buffer object parameters define properties of the data flows specified therein. In one or more example implementations, the buffer object parameters specify dimensionality of multi-dimensional data stored by the plurality of buffer objects. That is, the buffer object parameters specify the particular dimensions of the multi-dimensional data structure. In one or more example implementations, the buffer object parameters specify read access patterns and write access patterns for multi-dimensional data stored in the plurality of buffer objects. For example, the read access patterns and the write access patterns specify at least one of tiling parameters or traversal parameters.

As discussed, the graph APIs 104, as provided by compilation system 100, are capable of providing APIs that support creation of buffer objects and defining the various buffer object parameters described within this disclosure.

In block 410, compilation system 100 generates compiled data flow graph 120. Compiled data flow graph 120 may be binary data that is loadable into target hardware such as an IC, that includes data processing array 140 to configure data processing array 140 to implement the application specified by data flow graph 110.

For example, as part of generating compiled data flow graph 120, in block 412, compilation system 100 generates data that configures data processing array 140 to implement the data flows among the plurality of different levels of the memory hierarchy as specified by the plurality of buffer objects and the buffer object parameters. The data generated may be included in, or part of, the binary data constituting compiled data flow graph 120. For example, the data generated that configures data processing array 140 to implement the data transfers among the plurality of different levels of the memory hierarchy configures one or more DMA circuits (e.g., one or more of DMA circuits 224, 220, and/or 214) of tiles of data processing array 140 to implement the data transfers.

In block 414, the compilation system, or another system in communication with target hardware such as an IC that includes data processing array 140, loads the compiled data flow graph 120 into the target hardware. In loading the compiled data flow graph 120 into the target hardware, the compiled kernels, as mapped to particular compute tiles, may be loaded into program memories 210 of the respective compute tiles 202 to which the kernels have been mapped during compilation. In loading the compiled data flow graph 120 into the target hardware, stream interconnects 216 are configured to implement stream channels among the compute tiles 202 executing kernels, the various memory tiles 206 implementing buffers, and the various interface tiles 204 implementing communication pathways. In loading the compiled data flow graph 120 into the target hardware, memories (e.g., external memory 250, memory tiles 206, and/or data memories 212) may be initialized. In addition, the data that configures data processing array 140 to implement the data transfers of data flow graph 110 among the plurality of different levels of the memory hierarchy is loaded. In one or more example implementations, this process entails loading the data into control/configuration registers of the various DMA circuits 214, 220, and/or 224 of data processing array 140.

FIG. 5 illustrates an example of a data flow graph 500 specifying an application intended for implementation in data processing array 140. In the example, data flow graph 500 defines kernels "k1," "k2," "k3," and "k4" at lines 3 and 7-8. These kernels communicate by way of a shared buffer object mtx defined at lines 4 and 9. In line 9, the shared buffer object is created and specified as a 10 element by 6 element array having 2 input ports and 2 output ports.

At line 10, an output port 0 of kernel k1 is connected to input port 0 of the shared buffer mtx. At line 13, an output port 0 of kernel k2 is connected to an input port 1 of the shared buffer mtx. At line 16, an output port 0 of the shared buffer mtx is connected to an input port 0 of kernel k3. At line 19, an output port 1 of the shared buffer mtx is connected to an input port 0 of kernel k4. Thus, in the example of FIG. 5, kernels k1 and k2 are both data producers of, or with respect to, the shared buffer mtx. Kernels k3 and k4 are both data consumers of, or with respect to, the shared buffer mtx.

Lines 11-12 define the write access of kernel k1 to the shared buffer mtx via the input port 0 of the shared buffer mtx. Lines 11-12 define the write access by way of the buffer object parameters listed. These buffer object parameters include tiling parameters defining the dimensionality of the write-data. The tiling parameters include those specified by buffer dimension, tiling dimension, and offset. These buffer object parameters also include traversal parameters defining how to traverse or move through the multi-dimensional data. The traversal parameters include those defined by tiling traversal which specifies dimension, stride, and wrap.

Lines 14-15 define write access of kernel k2 to the shared buffer mtx by way of input port 1 of the shared buffer mtx. Lines 14-15 define the write access by way of the buffer object parameters listed.

Lines 17-18 define the read access of kernel k3 to the shared buffer mtx via the output port 0 of the shared buffer mtx. Lines 17-18 define the read access by way of the buffer object parameters listed. These buffer object parameters include tiling parameters defining the dimensionality of the read-data. The tiling parameters include those specified by buffer dimension, tiling dimension, and offset. These buffer object parameters also include traversal parameters defining how to traverse or move through the multi-dimensional data. The traversal parameters include those defined by tiling traversal which specifies dimension, stride, and wrap.

Lines 20-21 define read access of kernel k4 to the shared buffer mtx by way of output port 1 of the shared buffer mtx. Lines 20-21 define the read access by way of the buffer object parameters listed.

Figure 6:
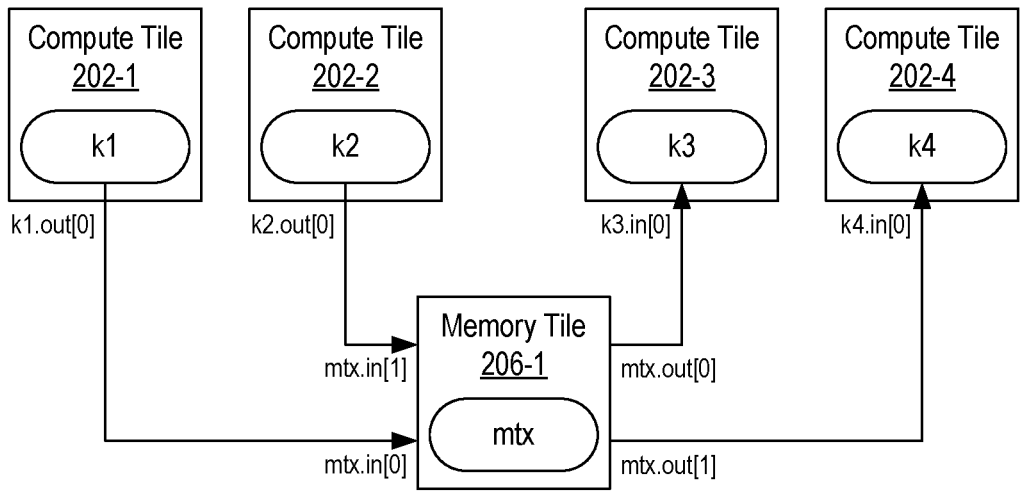
FIG. 6 illustrates a portion of a data processing array implementing the application of FIG. 5 after having been compiled.

FIG. 6 illustrates a portion of data processing array 140 implementing the application of FIG. 5 after having been compiled. In the example of FIG. 6, each of kernels k1, k2, k3, and k4 is implemented in a different compute tile 202. For purposes of illustration, kernel k1 is executed by compute tile 202-1, kernel k2 is executed by compute tiles 202-2, kernel k3 is executed by compute tile 202-3, and kernel k4 is executed by compute tile 202-4. The compiled version of each respective kernel is stored in program memory 210 of the respective compute tile 202 to be executed by the respective core 208 of the compute tile 202. Shared buffer mtx is implemented in memory tile 206-1. The example of FIG. 5 is annotated to illustrate the various input port and output port connections between the kernels k1, k2, k3, and k4 and the shared buffer mtx.

The example of FIG. 6 is provided for purposes of illustration only. In one or more other example implementations, two or more kernels may be implemented in, or executed by, a single compute tile 202 depending on the resources required to execute each respective kernel and/or the expected performance of the application as implemented in data processing array 140. In such cases, there need not be a one-to-one association of kernels to compute tiles.

Figure 7A:
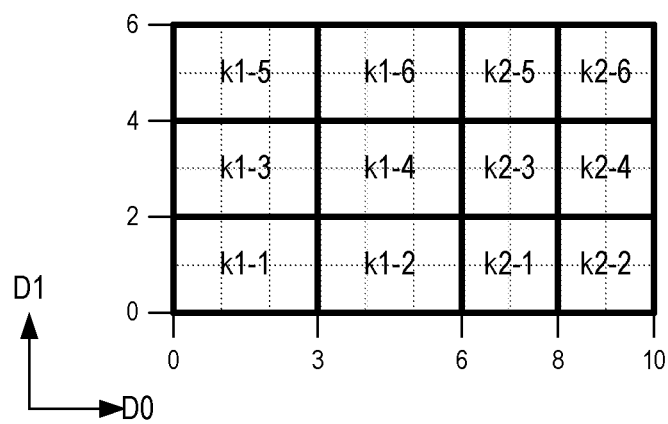
FIG. 7A illustrates an example write access pattern of a shared buffer.

FIGS. 7A and 7B illustrate an example data structure corresponding to the shared buffer mtx of FIGS. 5 and 6. FIG. 7A illustrates write access patterns of shared buffer mtx by the data producers k1 and k2. FIG. 7B illustrates read access patterns of shared buffer mtx by the data consumers k3 and k4. Referring to both FIGS. 7A and 7B, the data structure has an overall dimensionality of 10×6 as defined in FIG. 5.

The write access pattern for kernel k1 is specified at lines 11-12 of FIG. 5. Referring to the example of FIG. 7A, kernel k1 writes data as 3×2 data tiles as specified by tiling dimension={3,2} in line 11 of FIG. 5. The write access pattern for kernel k2 is specified at lines 14-15 of FIG. 5. Referring to FIG. 7A, kernel k2 writes data as 2×2 data tiles as specified by the tiling dimension={2,2} in line 14 of FIG. 5. Each of kernels k1 and k2 may write to shared buffer mtx concurrently as each of kernels k1 and k2 writes to a different portion of memory. That is, kernels k1 and k2 write to non-overlapping portions of shared buffer mtx.

In the example of FIG. 7A, the order in which kernel k1 writes data tiles is illustrated by the numeric values overlayed on the data tiles. For example, kernel k1 writes the data tile "k1-1" first, then the data tile "k1-2" second, then the data tile "k1-3", and so forth. The tiling traversal parameters define how data is specifically written. For example, at line 12 of FIG. 5, two sets of tiling traversal parameters are specified. The first set corresponds to an inner loop that specifies how data tiles are written with respect to a first dimension of the multi-dimensional array. The second set of parameters corresponds to an outer loop that specifies how data tiles are written with respect to a second dimension of the multi-dimensional array. In this example, the data structure is a 2D array. Accordingly, the primary dimension (e.g., dimension 0) corresponds to the D0-axis. The secondary dimension (e.g., dimension 1) corresponds to the D1-axis.

The starting point for the write accesses is defined by the offset parameter which specifies a starting point of (0,0) for write access of kernel k1 corresponding to the lower lefthand corner of the data structure illustrated. The first set of parameters corresponding to the inner loop is {.dimension=0, .stride=3, .wrap=2}. The dimension parameter value of 0 indicates that the dimension of tile traversal in the current loop is along the D0-axis. The wrap parameter value of 2 indicates that kernel k1 will write 2 data tiles along the D0-axis before incrementing along the next dimension corresponding to the D1-axis. The stride parameter value of 3 indicates that the starting address of each new data tile along the D0-axis will be 3 data blocks away from the starting point of the prior data tile. For example, the starting point of data tile k1-1 is (0,0). The stride parameter value of 3 indicates that the starting point of data tile k1-2 is (3,0).

The second set of parameters corresponding to the outer loop is {.dimension=1, .stride=2, .wrap=3}. The dimension parameter value of 1 indicates that the dimension of the current loop is along the D1-axis. The wrap parameter value of 3 indicates that kernel k1 will write 3 data tiles along the D1-axis. The stride parameter value of 2 indicates that the starting address of each new data tile along the D1-axis will be 2 data blocks away from the starting point of the prior data tile. For example, the starting point of data tile k1-1 is (0,0). The stride parameter value of 2 indicates that the starting point of data tile k1-3 is (0,2).

In the example of FIG. 7A, the order in which kernel k2 writes data tiles is illustrated by the numeric values overlayed over the data tiles. For example, kernel k2 writes the data tile "k2-1" first, then the data tile "k2-2" second, then the data tile "k2-3", and so forth. The tiling traversal parameters define how data is specifically written. For example, at line 15 of FIG. 5, two sets of tiling traversal parameters are specified. The first set corresponds to an inner loop that specifies how data tiles are written with respect to the first dimension of the multi-dimensional array. The second set of parameters corresponds to an outer loop that specifies how data tiles are written with respect to the second dimension of the multi-dimensional array.

The starting point for the write accesses is defined by the offset parameter which specifies a starting point of (6,0) for write access of kernel k2. The first set of parameters corresponding to the inner loop is {.dimension=0, .stride=2, .wrap=2}. The dimension parameter value of 0 indicates that the dimension of the current loop is along the D0-axis. The wrap parameter value of 2 indicates that kernel k2 will write 2 data tiles along the x-axis before incrementing along the next dimension corresponding to the D1-axis. The stride parameter value of 2 indicates that the starting address of each new data tile along the x-axis will be 2 data blocks away from the starting point of the prior data tile. For example, the starting point of data tile k2-1 is (6,0). The stride parameter value of 2 indicates that the starting point of data tile k2-2 is (8,0).

The second set of parameters corresponding to the outer loop is {.dimension=1, .stride=2, .wrap=3}. The dimension parameter value of 1 indicates that the dimension of the current loop is along the D1-axis. The wrap parameter value of 3 indicates that kernel k2 will write 3 data tiles along the y-axis. The stride parameter value of 2 indicates that the starting address of each new data tile along the D1-axis will be 2 data blocks away from the starting point of the prior data tile. For example, the starting point of data tile k2-1 is (6,0). The stride parameter value of 2 indicates that starting point of data tile k2-3 is (6,2).

The read access pattern for kernel k3 is specified at lines 17-18 of FIG. 5. Referring to the example of FIG. 7B, kernel k3 reads data as 2×6 data tiles as specified by tiling dimension={2,6} in line 17 of FIG. 5. The read access pattern for kernel k4 is specified at lines 20-21 of FIG. 5. Referring to FIG. 7B, kernel k4 writes data as 3×6 data tiles as specified by the tiling dimension={3,6} in line 20 of FIG. 5. Each of kernels k3 and k4 may read from shared buffer mtx concurrently. Further, though the read operations performed by kernels k3 and k4 do not overlap in this example, in other examples, the read operations performed by kernels k3 and k4 may overlap. Further, as noted, the read operations performed by kernels k3 and k4 may be performed concurrently. As discussed, however, the semantics of graph API 104 prevent read operations by either of kernels k3 or k4 until the write operations of both kernels k1 and k2 complete with respect to shared buffer mtx.

In the example of FIG. 7B, the order in which kernel k3 reads data tiles is illustrated by the numeric values overlayed on the data tiles. For example, kernel k3 writes the data tile "k3-1" first and then data tile "k3-2" second. The tiling traversal parameters define how data is specifically read. For example, at line 18 of FIG. 5, one set of tiling traversal parameters are specified. The set corresponds to a single loop that specifies how data tiles are read with respect to a first dimension of the multi-dimensional array.

The starting point for the read accesses is defined by the offset parameter which specifies a starting point of (0,0) for read access of kernel k3. The tiling parameters are {.dimension=0, .stride=2, .wrap=2}. The dimension parameter value of 0 indicates that the dimension of the current loop is along the D0-axis. The wrap parameter value of 2 indicates that kernel k3 will read 2 data tiles along the D0-axis. The stride parameter value of 2 indicates that the starting address of each new data tile along the D0-axis will be 2 data blocks away from the starting point of the prior data tile. For example, the starting point of data tile k3-1 is (0,0). The stride parameter value of 2 indicates that the starting point of data tile k3-2 is (2,0).

In the example of FIG. 7B, the order in which kernel k4 reads data tiles is illustrated by the numeric values overlayed on the data tiles. For example, kernel k4 reads the data tile "k4-1" first and the data tile "k4-2" second. The tiling traversal parameters define how data is specifically read. For example, at line 21 of FIG. 5, a set of tiling traversal parameters is specified. The set corresponds a loop that specifies how data tiles are read by kernel k4 with respect to the first dimension of the multi-dimensional array.

The starting point for the read accesses is defined by the offset parameter which specifies a starting point of (4,0) for read access of kernel k4. The set of parameters is {.dimension=0, .stride=3, .wrap=2}. The dimension parameter value of 0 indicates that the dimension of the current loop is along the D0-axis. The wrap parameter value of 2 indicates that kernel k4 will read 2 data tiles along the D0-axis. The stride parameter value of 3 indicates that the starting address of each new data tile along the x-axis will be 3 data blocks away from the starting point of the prior data tile. For example, the starting point of data tile k4-1 is (4,0). The stride parameter value of 3 indicates that the starting point of data tile k4-2 is (7,0).

FIG. 8 illustrates another example of a data flow graph 800 specifying an application intended for implementation in data processing array 140. In the example of FIG. 8, the application includes data movement across multiple levels of a memory hierarchy and an external memory. In the example, data flow graph 800 defines kernels k1 and k2 at lines 2 and 7. These kernels utilize data from a shared buffer tensor and an external buffer "ddrin". The example of FIG. 8 illustrates how one may specify connectivity between a shared buffer object and an external buffer object. It should be appreciated that further source code may be included to establish connections between kernels k1 and k2 between the shared buffer and/or the external buffer as the case may be. Data flow graph 800 illustrates how to specify data movement from the external buffer "ddrin" to the shared buffer tensor.

In the example, the external buffer ddrin stores a multi-dimensional array having the dimensions (10, 6, 100). The external buffer ddrin includes one read output port. The shared buffer tensor stores a sub-volume of the multi-dimensional array having the dimensions (10,6,10). At line 11, an output port 0 of external buffer ddrin is connected to an input port of shared buffer tensor.

At lines 12-13, read access of external buffer ddrin by way of output port 0 is specified. The read access of external buffer ddrin may be implemented by a DMA circuit disposed in an interface tile 204 and a DMA circuit disposed in a memory tile 206. As illustrated, the read access pattern indicates that the buffer dimension is (10,6,100). Lines 12-13 define the read access of the shared buffer tensor to the external buffer ddrin via the output port 0 of the external buffer ddrin. Lines 12-13 define the read access by way of the buffer object parameters listed. These buffer object parameters include tiling parameters defining the dimensionality of the data. The tiling parameters include those specified by buffer dimension, tiling dimension, and offset. These buffer object parameters also include traversal parameters defining how to traverse or move through the multi-dimensional data. The traversal parameters include those defined by tiling traversal which specifies dimension, stride, and wrap.

Figure 9:
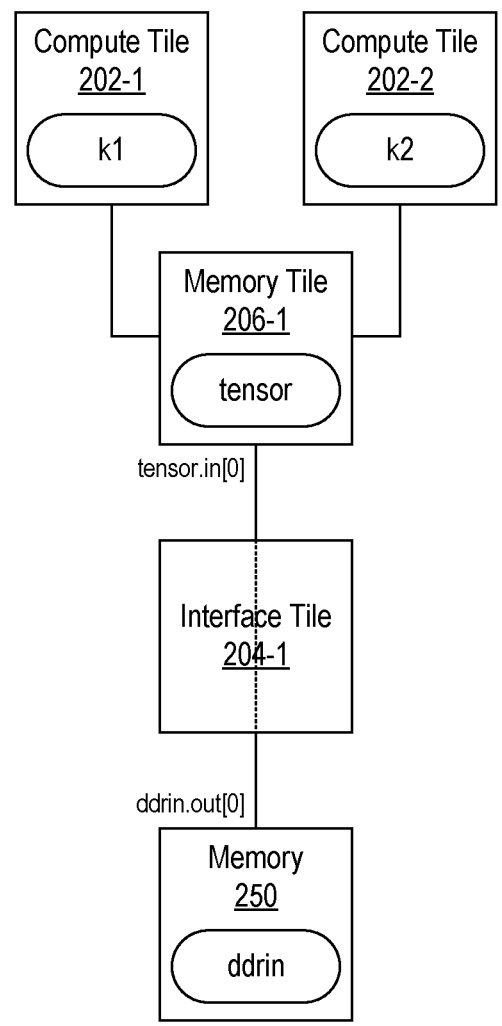
FIG. 9 illustrates a portion of a data processing array implementing the application of FIG. 8 after having been compiled.

FIG. 9 illustrates a portion of data processing array 140 implementing the application of FIG. 8 after having been compiled. In the example of FIG. 9, each of kernels k1 and k2 is implemented in a different compute tile 202. For purposes of illustration, kernel k1 is executed by compute tile 202-1 and kernel k2 is executed by compute tiles 202-2. The compiled version of each respective kernel is stored in the program memory 210 of the respective compute tile 202 shown and executed by the respective core 208 of the compute tile 202. Shared buffer tensor is implemented in memory tile 206-1. External buffer object ddrin is implemented in external memory 250. The example of FIG. 5 is annotated to illustrate the various input port and output port connections between the external buffer ddrin and shared buffer tensor.

The example of FIG. 9 is provided for purposes of illustration only. In one or more other example implementations, more than one kernels may be implemented in, or executed by, a single compute tile depending on the resources required to execute the kernels and/or the expected performance of the application as implemented in data processing array 140. In such cases, there need not be a one-to-one association of kernels to compute tiles.

Figure 10A:
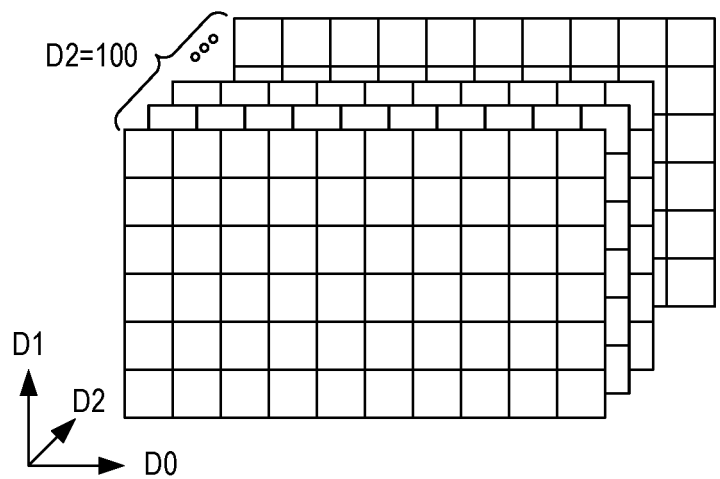
FIG. 10A illustrates an example data structure stored in an external buffer.
Figure 10B:
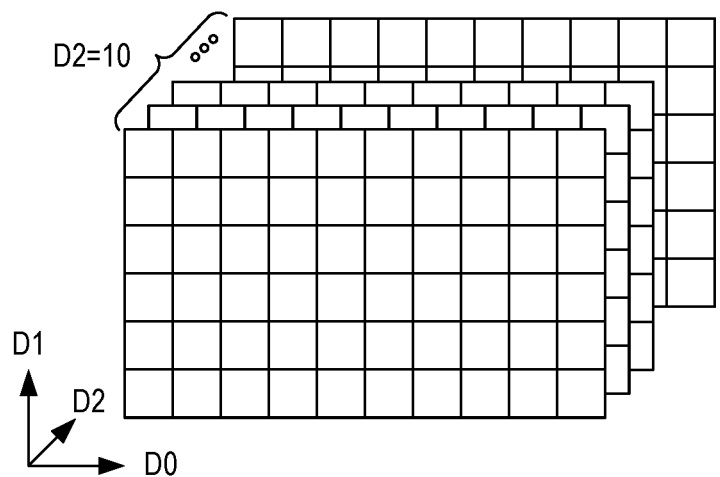
FIG. 10B illustrates an example data structure stored in a shared buffer.

FIGS. 10A and 10B illustrate an example data structure corresponding to the external buffer ddrin and the shared buffer tensor of FIGS. 8 and 9. FIG. 10A illustrates the data structure of the external buffer ddrin. FIG. 10B illustrates the data structure of the shared buffer tensor. Both the data structures of FIGS. 10A and 10B are 3D data structures.

Referring to the example of FIG. 10A, the data structure has the dimensions (10,6,100) in the respective dimensions D0, D1, and D2. In general, global memory, e.g., external memory 250, has more storage capacity than that of a memory tile 206. Further, a memory tile 206 generally has more storage capacity than data memory 212 of a compute tile 202. For purposes of illustration and not limitation, external memory 250 may be gigabytes in size. Memory tile 206 may be limited to 512 KB in size. Data memory 212 may be smaller in size than the memory tile 206. This disparate sizing illustrates the need to implement tiling across the memory hierarchy of data processing array 140.

Referring to the example of FIG. 10B, the data structure has the dimensions (10,6,10). That is, in the dimension D3, the data structure of FIG. 10B is one-tenth the size of the data structure of FIG. 10A. In this example, the shared buffer tensor is considered a sub-volume of the data stored in external buffer ddrin.

Referring to line 13 of FIG. 8, the starting point for the read accesses is defined by the offset parameter which specifies a starting point of (0,0) for read access of shared buffer tensor to external buffer ddrin. Referring to the tilling traversal parameter of {.dimension=2, .stride=10, .wrap=10}, the dimension parameter value of 2 indicates that the dimension of the current loop is along the D2-axis. The wrap parameter value of 10 indicates that sub-volumes of data are read from external buffer ddrin along the D2-axis. The stride parameter value of 10 indicates that the starting address of each new data tile along the D2-axis will be 10 data blocks away from the starting point of the prior data tile. For example, the starting point of external buffer ddrin to be read and stored as a sub-volume in shared buffer tensor is (0,0,0). The stride parameter value of 10 indicates that the starting point of the next portion of data to be read from external buffer ddrin and stored as a sub-volume in shared buffer tensor is (0,0,10).

In the example of FIG. 10B, kernels k1 and k2 may be data consumers and access data in the manner, e.g., tiling, shown. As the tiling access for kernels with respect to read and write has been described, the example of FIG. 8 does not illustrate read and/or write patterns of kernels to the data stored in shared buffer tensor.

The example of FIGS. 10A and 10B illustrates a multi-rate behavioral aspect of the inventive arrangements. That is, a multi-rate data access pattern is used across the external buffer and the shared buffer. Since the external buffer is capable of storing more data than the shared buffer, to fully process the data stored in the external buffer (e.g., FIG. 10A), 10 iterations of processing data from the downstream shared buffer (FIG. 10B) by the processing kernels are needed.

The inventive arrangements described herein as implemented and/or provided by the graph APIs 104 and compiler 106 are capable of supporting one or more other features relating to the architecture of data processing array 140. In one aspect, the graph API 104 and compiler 106 support semaphore locks. The semaphore locks may be used to control read and/or write accesses and ensure that read accesses to a particular buffer do not begin until, or responsive to, any writes to that buffer completing. In another example, zero-padding of data may be supported.

Figure 11:
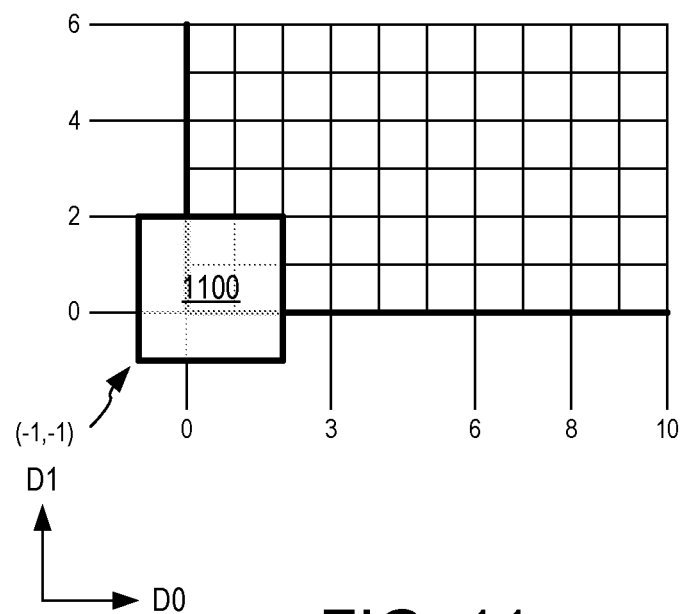
FIG. 11 illustrates an example of a read access pattern in which zero-padding may be implemented.
Figure 12:
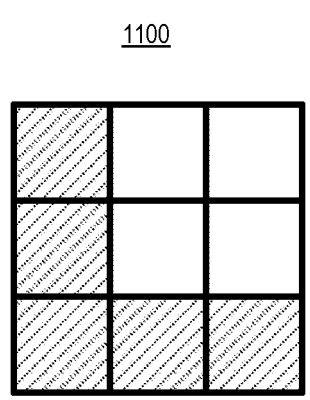
FIG. 12 illustrates the zero padded portions of a data tile from FIG. 11.

FIG. 11 illustrates an example read access pattern in which zero-padding may be implemented automatically by the graph APIs 104 and compiler 106. In the example of FIG. 11, by specifying an offset of (−1,−1), graph API 104 and compiler 106 may automatically implement zero padding. That is, those portions of the data tile 1100 being read that do not overlap with the data structure (e.g., correspond to negative coordinate locations for the dimensions involved in this example) may be set to zero automatically by the hardware (e.g., DMA circuits) as configured using the semantics illustrated in FIG. 11. For example, FIG. 12 illustrates the zero padded portions of data tile 1100, which is a 3×3 data tile. The shaded blocks correspond to zero-padded portions.

Figure 13:
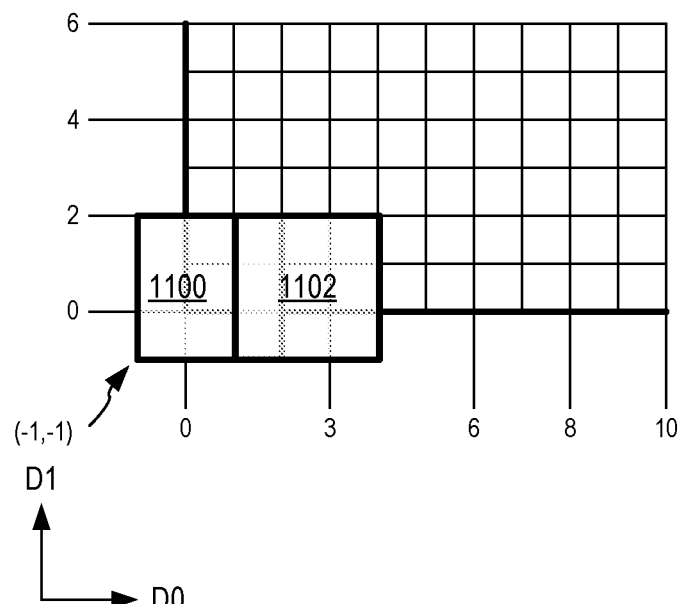
FIG. 13 illustrates another example of a read access pattern involving an overlap region shared between two data tiles.

FIG. 13 illustrates another example read access pattern in which regions may be overlapped when read. In the example of FIG. 13, the data tile is 3×3 (e.g., the same as illustrated in the examples of FIGS. 11 and 12). By specifying a stride value of 2, the next data tile 1102 has a starting location of (1, −1), causing a portion of the data tile 1100 (e.g., an overlap region) to be re-read and output as part of data tile 1102. The overlap region includes the data blocks (1, −1), (1,0), and (1,2).

Figure 14:
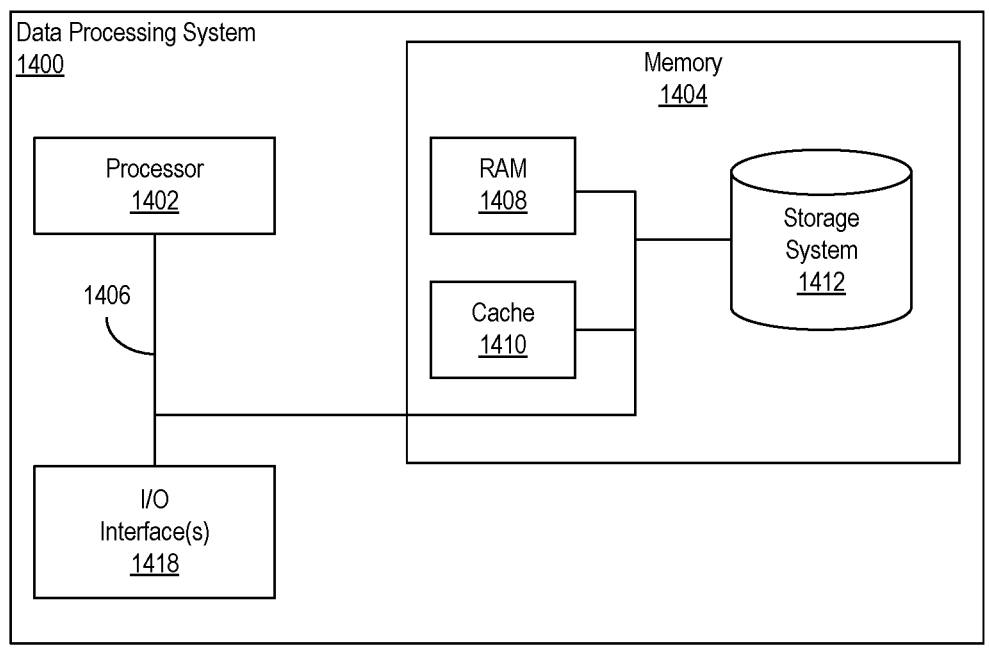
FIG. 14 illustrates an example implementation of a data processing system.

FIG. 14 illustrates an example implementation of a data processing system 1400. As defined herein, the term "data processing system" means one or more hardware systems configured to process data, each hardware system including at least one processor and memory, wherein the processor is programmed with computer-readable instructions that, upon execution, initiate operations. Data processing system 1400 can include a processor 1402, a memory 1404, and a bus 1406 that couples various system components including memory 1404 to processor 1402.

Processor 1402 may be implemented as one or more processors. In an example, processor 1402 is implemented as a central processing unit (CPU). Processor 1402 may be implemented as one or more circuits capable of carrying out instructions contained in program code. The circuit may be an integrated circuit or embedded in an integrated circuit. Processor 1402 may be implemented using a complex instruction set computer architecture (CISC), a reduced instruction set computer architecture (RISC), a vector processing architecture, or other known architectures. Example processors include, but are not limited to, processors having an x86 type of architecture (IA-32, IA-64, etc.), Power Architecture, ARM processors, and the like.

Bus 1406 represents one or more of any of a variety of communication bus structures. By way of example, and not limitation, bus 1406 may be implemented as a Peripheral Component Interconnect Express (PCIe) bus. Data processing system 1400 typically includes a variety of computer system readable media. Such media may include computer-readable volatile and non-volatile media and computer-readable removable and non-removable media.

Memory 1404 can include computer-readable media in the form of volatile memory, such as random-access memory (RAM) 1408 and/or cache memory 1410. Data processing system 1400 also can include other removable/non-removable, volatile/non-volatile computer storage media. By way of example, storage system 1412 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 1406 by one or more data media interfaces. Memory 1404 is an example of at least one computer program product.

Memory 1404 is capable of storing computer-readable program instructions that are executable by processor 1402. For example, the computer-readable program instructions can include an operating system, one or more application programs, other program code, and program data. Processor 1402, in executing the computer-readable program instructions, is capable of performing the various operations described herein that are attributable to a computer. For example, processor 1402, in executing the computer-readable program instructions is capable of implementing the functions and/or operations described in connection with compilation system 100 of FIG. 1 and FIG. 4.

It should be appreciated that data items used, generated, and/or operated upon by data processing system 1400 are functional data structures that impart functionality when employed by data processing system 1400. As defined within this disclosure, the term "data structure" means a physical implementation of a data model's organization of data within a physical memory. As such, a data structure is formed of specific electrical or magnetic structural elements in a memory. A data structure imposes physical organization on the data stored in the memory as used by an application program executed using a processor.

Data processing system 1400 may include one or more Input/Output (I/O) interfaces 1418 communicatively linked to bus 1406. I/O interface(s) 1418 allow data processing system 1400 to communicate with one or more external devices and/or communicate over one or more networks such as a local area network (LAN), a wide area network (WAN), and/or a public network (e.g., the Internet). Examples of I/O interfaces 1418 may include, but are not limited to, network cards, modems, network adapters, hardware controllers, etc. Examples of external devices also may include devices that allow a user to interact with data processing system 1400 (e.g., a display, a keyboard, and/or a pointing device) and/or other devices such as accelerator card.

Data processing system 1400 is only one example implementation. Data processing system 1400 can be practiced as a standalone device (e.g., as a user computing device or a server, as a bare metal server), in a cluster (e.g., two or more interconnected computers), or in a distributed cloud computing environment (e.g., as a cloud computing node) where tasks are performed by remote processing devices that are linked through a communications network. In a distributed cloud computing environment, program modules may be located in both local and remote computer system storage media including memory storage devices.

As used herein, the term "cloud computing" refers to a computing model that facilitates convenient, on-demand network access to a shared pool of configurable computing resources such as networks, servers, storage, applications, ICs (e.g., programmable ICs) and/or services. These computing resources may be rapidly provisioned and released with minimal management effort or service provider interaction. Cloud computing promotes availability and may be characterized by on-demand self-service, broad network access, resource pooling, rapid elasticity, and measured service.

The example of FIG. 14 is not intended to suggest any limitation as to the scope of use or functionality of example implementations described herein. Data processing system 1400 is an example of computer hardware that is capable of performing the various operations described within this disclosure. In this regard, data processing system 1400 may include fewer components than shown or additional components not illustrated in FIG. 14 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer-readable storage medium" means a storage medium that contains or stores program instructions for use by or in connection with an instruction execution system, apparatus, or device. As defined herein, a "computer-readable storage medium" is not a transitory, propagating signal per se. The various forms of memory, as described herein, are examples of computer-readable storage media. A non-exhaustive list of examples of computer-readable storage media include an electronic storage device, a magnetic storage device, an optical storage device, an electromagnetic storage device, a semiconductor storage device, or any suitable combination of the foregoing. A non-exhaustive list of more specific examples of a computer-readable storage medium may include: a portable computer diskette, a hard disk, a RAM, a read-only memory (ROM), an erasable programmable read-only memory (EPROM or Flash memory), an electronically erasable programmable read-only memory (EEPROM), a static random-access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer-readable storage medium (or media) having computer-readable program instructions thereon for causing a processor to carry out aspects of the inventive arrangements described herein. Within this disclosure, the term "program code" is used interchangeably with the term "program instructions." Computer-readable program instructions described herein may be downloaded to respective computing/processing devices from a computer-readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object-oriented programming language and/or procedural programming languages. Computer-readable program instructions may include state-setting data. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer-readable program instructions by utilizing state information of the computer-readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer-readable program instructions, e.g., program code.

These computer-readable program instructions may be provided to a processor of a computer, special-purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer-readable program instructions may also be stored in a computer-readable storage medium that can direct a computer, a programmable data processing apparatus, and/or other devices to function in a particular manner, such that the computer-readable storage medium having instructions stored therein comprises an article of manufacture including instructions which implement aspects of the operations specified in the flowchart and/or block diagram block or blocks.

The computer-readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

What is claimed is:

1. A method, comprising:
   receiving a data flow graph specifying an application for execution on a data processing array, wherein the data flow graph includes a plurality of computational nodes and a plurality of data nodes, and wherein the plurality of data nodes defines a plurality of buffer objects corresponding to a plurality of different levels of a memory hierarchy of the data processing array and an external memory;
   detecting data flows based on the plurality of buffer objects and buffer object parameters of the plurality of buffer objects; and
   generating data that configures the data processing array to implement the data flows among the plurality of different levels of the memory hierarchy and the external memory based on the plurality of buffer objects and the buffer object parameters.

2. The method of claim 1, wherein one or more of the data flows is between a buffer object selected from the plurality of buffer objects and multiple data consumers.

3. The method of claim 1, wherein one or more of the data flows is between a buffer object selected from the plurality of buffer objects and multiple data producers.

4. The method of claim 1, wherein the buffer object parameters specify dimensionality of multi-dimensional data stored by the plurality of buffer objects.

5. The method of claim 1, wherein the buffer object parameters specify read access patterns and write access patterns of the data flows for multi-dimensional data stored in the plurality of buffer objects.

6. The method of claim 5, wherein the read access patterns and the write access patterns specify at least one of tiling parameters or traversal parameters.

7. The method of claim 1, wherein the memory hierarchy includes data memories of compute tiles and memories of memory tiles, wherein the memory tiles are distinct from the compute tiles, and wherein one or more of the plurality of buffer objects is a shared buffer object representing a memory of a selected memory tile of the data processing array.

8. The method of claim 7, wherein one or more of the plurality of buffer objects is an external buffer object representing the external memory, and wherein the data flows convey data between the external memory, one or more of the memory tiles, and one or more of the compute tiles.

9. The method of claim 1, wherein the data generated that configures the data processing array to implement the data flows among the plurality of different levels of the memory hierarchy and the external memory configures one or more direct memory access circuits of tiles of the data processing array to implement the data flows.

10. A system, comprising:
one or more processors configured to initiate operations including:
receiving a data flow graph specifying an application for execution on a data processing array, wherein the data flow graph includes a plurality of computational nodes and a plurality of data nodes, and wherein the plurality of data nodes defines a plurality of buffer objects corresponding to a plurality of different levels of a memory hierarchy of the data processing array and an external memory;
detecting data flows based on the plurality of buffer objects and buffer object parameters of the plurality of buffer objects; and
generating data that configures the data processing array to implement the data flows among the plurality of different levels of the memory hierarchy and the external memory based on the plurality of buffer objects and the buffer object parameters.

11. The system of claim 10, wherein one or more of the data flows is between a buffer object selected from the plurality of buffer objects and multiple data consumers.

12. The system of claim 10, wherein one or more of the data flows is between a buffer object selected from the plurality of buffer objects and multiple data producers.

13. The system of claim 10, wherein the buffer object parameters specify dimensionality of multi-dimensional data stored by the plurality of buffer objects.

14. The system of claim 10, wherein the buffer object parameters specify read access patterns and write access patterns of the data flows for multi-dimensional data stored in the plurality of buffer objects.

15. The system of claim 14, wherein the read access patterns and the write access patterns specify at least one of tiling parameters or traversal parameters.

16. The system of claim 10, wherein the memory hierarchy includes data memories of compute tiles and memories of memory tiles, wherein the memory tiles are distinct from the compute tiles, and wherein one or more of the plurality of buffer objects is a shared buffer object representing a memory of a selected memory tile of the data processing array.

17. The system of claim 16, wherein one or more of the plurality of buffer objects is an external buffer object representing the external memory, and wherein the data flows convey data between the external memory, one or more of the memory tiles, and one or more of the compute tiles.

18. The system of claim 10, wherein the data generated that configures the data processing array to implement the data flows among the plurality of different levels of the memory hierarchy and the external memory configures one or more direct memory access circuits of tiles of the data processing array to implement the data flows.

19. A computer program product, comprising:
one or more non-transitory computer-readable storage media, and program instructions collectively stored on the one or more computer-readable storage media, wherein the program instructions are executable by computer hardware to initiate operations including:
receiving a data flow graph specifying an application for execution on a data processing array, wherein the data flow graph includes a plurality of computational nodes and a plurality of data nodes, and wherein the plurality of data nodes defines a plurality of buffer objects corresponding to a plurality of different levels of a memory hierarchy of the data processing array and an external memory;
detecting data flows based on the plurality of buffer objects and buffer object parameters of the plurality of buffer objects; and
generating data that configures the data processing array to implement the data flows among the plurality of different levels of the memory hierarchy and the external memory based on the plurality of buffer objects and the buffer object parameters.

20. The computer program product of claim 19, wherein the data generated that configures the data processing array to implement the data flows among the plurality of different levels of the memory hierarchy and the external memory configures one or more direct memory access circuits of tiles of the data processing array to implement the data flows.

* * * * *